No. 608,531. Patented Aug. 2, 1898.
J. R. STEPHENSON.
CARBURETER.
(Application filed June 28, 1897.)
(No Model.)
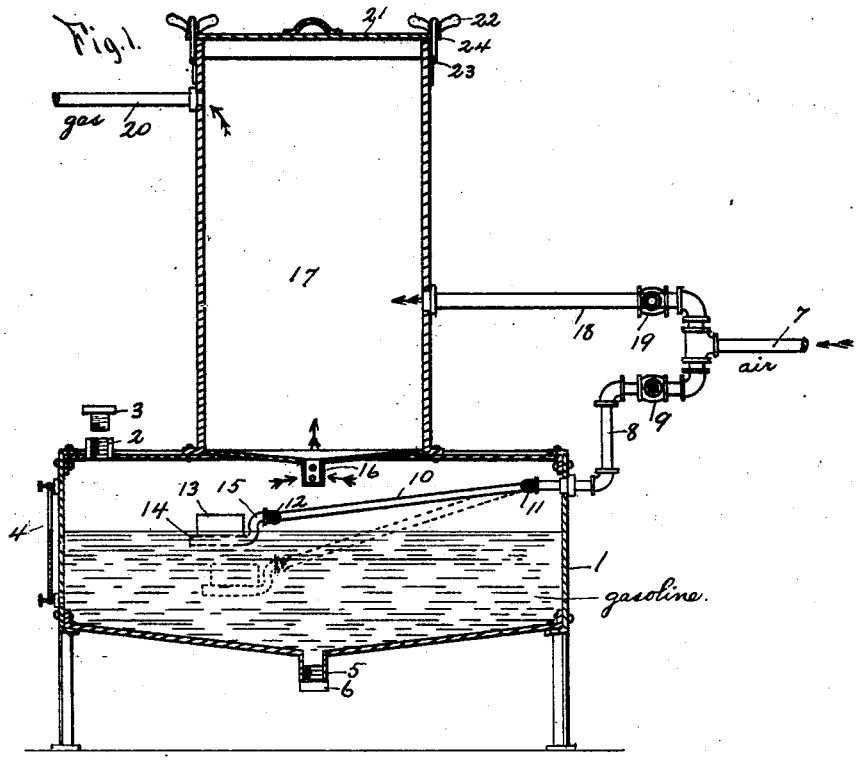
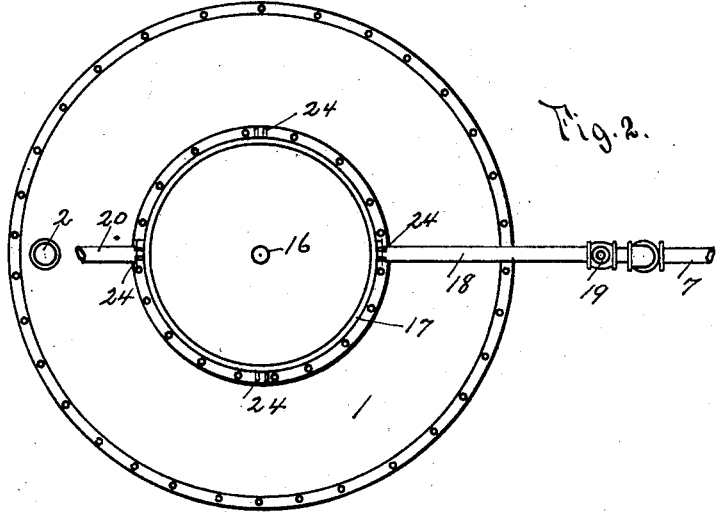
Witnesses
M. S. Hinman
Walter H. Graves
Inventor
John R. Stephenson.
By N. B. Hagin Atty.
THE NORRIS PETERS CO., PHOTO-LITHO., WASHINGTON, D. C.

UNITED STATES PATENT OFFICE.

JOHN R. STEPHENSON, OF WICHITA, KANSAS, ASSIGNOR, BY DIRECT AND MESNE ASSIGNMENTS, OF THREE-FOURTHS TO LUIS LAMPL, HERMAN BENSCHEIDT, AND W. T. RUSSELL, OF SAME PLACE.

CARBURETER.

SPECIFICATION forming part of Letters Patent No. 608,531, dated August 2, 1898.

Application filed June 28, 1897. Serial No. 642,677. (No model.)

*To all whom it may concern:*

Be it known that I, JOHN R. STEPHENSON, a citizen of the United States of America, residing at Wichita, in the county of Sedgwick and State of Kansas, have invented certain new and useful Improvements in Carbureters, of which the following is a specification, reference being had therein to the accompanying drawings and the figures of reference thereon, forming a part of this specification, in which—

Figure 1 is a sectional view of my improved process of and apparatus for manufacturing gas from gasolene. Fig. 2 is a top plan of the same.

This invention relates to certain improvements in an apparatus for manufacturing gas from gasolene by forcing air through said gasolene; and it consists of a tank adapted to hold a supply of gasolene, a floating pipe leading into said tank from an air pump or compressor, a gas-reservoir adapted to receive said air impregnated with gasolene, and pipes leading from said gas-reservoir to a storage-chamber or to the point of consumption; and the object of my invention is to produce gas from gasolene by air and without heat.

Referring to the drawings, 1 represents a tank for holding gasolene. 2 represents an opening in said tank, which is provided with the screw-cap 3. Said tank 1 is filled with gasolene through said opening. 4 represents a gasolene-gage. 5 represents an opening in the bottom of said tank having the screw-plug 6.

7 represents a pipe leading from an air-compressor to the pipe 8 by opening the valve 9.

10 represents a pipe having the swinging joints 11 and 12. Said pipe is connected to said pipe 8 through the medium of said joint 11.

13 represents a float secured to the open end 14 of the air-pipes 8 and 10. Said pipe 14 has the bend 15, so that the discharge or open end 14 may be kept under the surface of the gasolene and the joint 12 and a portion of the float above the surface of said gasolene. Said float is made hollow, with an opening in the top adapted to receive weights for the purpose of regulating the depth of said discharge end 14 into the gasolene.

16 represents a screened opening in the hopper-bottom of the gas-chamber 17, through which the mixed gasolene and air pass into said chamber 17.

18 represents a pipe which is provided with the valve 19. Said pipe leads from the air-pipe 7 to the gas-chamber 17 and is for the purpose of supplying a larger amount of air to said gas in cases where the air passing from lower or gasolene chamber is too strongly impregnated with gasolene, thus increasing the proportion of air to gas. 20 represents a gas-pipe leading from said gas-chamber to a gas-holder or to the point of consumption. 21 represents a cover to said gas-chamber. Said cover is provided with lugs or notches 24 and is held down by the thumb-screws 22, which are hinged to said tank 17 at 23.

Gas is manufactured by the following-described process with this apparatus: Gasolene is first poured into the tank 1. Air is then either forced into the pipes 8 and 18 from an air-pump or into the pipe 7 from an air-compressor. The valve 9 is then opened, which allows the air to pass into the pipe 10 and out of the pipe at 14, which is always held under the surface of the gasolene at any desired depth by the float 13. The air passes out of said pipe into the gasolene, and as said air passes up through said gasolene it becomes impregnated with said gasolene, said impregnated air forming a gas, which passes through the screened opening 16 into the gas-chamber 17, where it remains until it is allowed to escape through the pipe 20 to the point of consumption. Should said air become too strongly impregnated with gasolene, the valve 19 may be opened, which will allow a supply of air to enter into the chamber 17 through the pipe 18, where it will mix with the gas in said chamber 17, thus increasing the proportion of air to a given amount of gasolene.

Having thus described my invention, what I claim as new and useful, and desire to secure by Letters Patent, is as follows:

1. The herein-described apparatus for manufacturing gas from gasolene, consisting of the combination of a tank adapted to hold a supply of gasolene, a gas-receiving chamber having a sloping bottom for the purpose specified, and a removable top, said gas-tank secured to said gasolene-tank, pipes leading from an air-pump or an air-condenser through which air can be forced into and through said gasolene in said tank, an air-pipe leading from said air pump or condenser, so that air can be forced into said gas-chamber independent from said gasolene-chamber, and pipes leading from said gas-chamber to the point of consumption.

2. An apparatus for manufacturing gas from gasolene, consisting of the combination of a gasolene-receptacle, a gas-receptacle secured to said gasolene-receptacle, having an opening, in and a sloping bottom for the purpose specified, an air-pipe leading from an air-condenser or an air-pump into said gasolene-chamber, said pipe having one end adapted to swing vertically, and an adjustable float secured to said free end of said pipe for holding said pipe under the surface of said gasolene, for the purpose specified, an air-pipe leading into said gas-chamber from said air-pump independent from said pipe leading into said gasolene-chamber, and an air-pipe leading from said gas-chamber to the point of consumption.

JOHN R. STEPHENSON.

Witnesses:
NANCY CAMPBELL,
JAMES L. DYER.